United States Patent [19]
Adachi et al.

[11] Patent Number: 4,730,879
[45] Date of Patent: Mar. 15, 1988

[54] ANTI-SKID APPARATUS FOR AUTOMOTIVE VEHICLE

[75] Inventors: Yoshiharu Adachi, Gamagori; Masamoto Ando; Hiroaki Takeuchi, both of Toyota; Noboru Noguchi; Nobuyasu Nakanishi, both of Toyota, all of Japan

[73] Assignees: Aisin Seiki Kabushiki Kaisha, Kariya; Toyota Jidosha Kabushiki Kaisha, Toyota, both of Japan

[21] Appl. No.: 15,322

[22] Filed: Feb. 17, 1987

[30] Foreign Application Priority Data

Feb. 14, 1986 [JP] Japan ................... 61-031224
Feb. 17, 1986 [JP] Japan ................... 61-032110

[51] Int. Cl.⁴ ............. B60T 8/36; B60T 8/88; B60T 13/16
[52] U.S. Cl. .................... 303/116; 303/114; 303/119
[58] Field of Search ........... 303/113, 114, 115, 116, 303/117, 119, 61–63, 68–69, 10–12, 111, 110, 92; 188/181 R, 181 A; 60/591, 547.1

[56] References Cited

U.S. PATENT DOCUMENTS

| | | | |
|---|---|---|---|
| 4,618,189 | 10/1986 | Nakanishi et al. | 303/119 X |
| 4,636,008 | 1/1987 | Adachi et al. | 303/116 X |
| 4,636,010 | 1/1987 | Adachi et al. | 303/119 X |
| 4,652,061 | 3/1987 | Nishimura et al. | 303/116 |
| 4,655,509 | 4/1987 | Ando et al. | 303/116 X |

FOREIGN PATENT DOCUMENTS 60-25834 2/1985 Japan .

Primary Examiner—Douglas C. Butler
Attorney, Agent, or Firm—Oblon, Fisher, Spivak, McClelland & Maier

[57] ABSTRACT

An anti-skid apparatus in a vehicle braking system including a bypass circuit connected in parallel with a braking circuit between a master cylinder and a wheel brake cylinder, wherein a fluid pump is disposed within the bypass circuit and connected to a fluid reservoir to produce a hydraulic power pressure, a first switchover valve is disposed within both the circuits to permit the flow of fluid passing through the braking circuit in its deactivated condition and to interrupt the braking circuit and connect the brake cylinder to the reservoir through the bypass circuit in its activated condition, a second switchover valve is disposed between the master cylinder and the first switchover valve to permit the flow of fluid passing through the braking circuit while the first switchover valve is maintained in its deactivated conidition and to interrupt the braking circuit and connect the pump to the brake cylinder in response to a decrease of the brake cylinder pressure caused by activation of the first switchover valve, a regulator valve is disposed within the bypass circuit between the pump and the second switchover valve to control the power pressure in dependence upon the master cylinder pressure, and a relief valve is disposed within the bypass circuit to maintain the power pressure at a predetermined value.

6 Claims, 3 Drawing Figures

ANTI-SKID APPARATUS FOR AUTOMOTIVE VEHICLE

BACKGROUND OF THE INVENTION

1. Field of the Invention

The present invention relates to an anti-skid apparatus for installation in a vehicle braking system to prevent the road wheels of the vehicle from locking in braking operation.

2. Description of the Prior Art

In Japanese Patent Early Publication No. 60-25834 issued on Feb. 8, 1985, there has been proposed an anti-skid apparatus which includes schematically illustrated in FIG. 3, a braking circuit 1 connecting a master cylinder M/C to a wheel brake cylinder W/C, a bypass circuit 6 connected in parallel with an intermediate portion of the braking circuit 1, a first solenoid valve Va of the normally closed type disposed within the bypass circuit 6, a second solenoid valve Vb of the normally open type disposed within the intermediate portion of the braking circuit 1, a fluid reservoir Ra disposed within the bypass circuit 6, a fluid pump P connected to the fluid reservoir Ra to produce a hydraulic power pressure therefrom, and an accumulator ACC connected to the bypass circuit 6 to store the hydraulic power pressure applied thereto from the fluid pump P through a check valve. The anti-skid apparatus further includes a check valve Vc of the normally open type disposed within the braking circuit 1, and a check valve 7 disposed within the bypass circuit 6 to interrupt the flow of fluid under pressure from the braking circuit 1 to the accumulator ACC. The check valve Vc includes a ball 2 engageable with a valve seat 3, and a coil spring 4 arranged to bias the ball 2 toward the valve seat 3. The fluid reservoir Ra includes a piston 9 loaded by a coil spring 8 toward the ball 2 of check valve Vc. Disposed between the ball 2 and piston 9 is a push rod 5 which is arranged to normally separate the ball 2 from the valve seat 3 under the load of coil spring 8.

In braking operation, the check valve Vc permits the flow of fluid under pressure supplied to the wheel brake cylinder W/C from the master cylinder M/C. When a road wheel tends to be locked in the braking operation, the first solenoid valve Va is energized to connect the wheel brake cylinder W/C to the fluid reservoir Ra through the bypass circuit 6, the second solenoid valve Vb is energized to close the intermediate portion of braking circuit 1, and the fluid pump P is driven to produce a hydraulic power pressure therefrom. As a result, the piston 9 of reservoir Ra is moved against the load of spring 8 to store the fluid under pressure supplied thereto from the wheel brake cylinder W/C. Subsequently, the check valve Vc is closed in response to retraction of the push rod 5 and maintained in its closed position under the pressure in braking circuit 1. During energization of the solenoid valves Va and Vb, the accumulator ACC acts to store the hydraulic power pressure applied thereto from the fluid pump P. When the solenoid valves Va and Vb are deenergized in response to a decrease of the wheel brake cylinder pressure, the power pressure is applied to the wheel brake cylinder W/C from the accumulator ACC through the check valve 7.

In such a conventional anti-skid apparatus as described above, the hydraulic power pressure may not be controlled in accordance with the braking pressure created in the master cylinder in braking operation. For this reason, if the road wheel tends to be locked by a low pressure in the wheel brake cylinder W/C in braking operation on a snow or frozen road, there will occur a large difference in pressure between the wheel brake cylinder W/C and the accumulator ACC. If the road wheel tends to be locked by a high pressure in the wheel brake cylinder W/C in braking operation on a normal road, there will occur a small difference in pressure between the wheel brake cylinder W/C and the accumulator ACC. This means that under control of the solenoid valves Va, Vb, the wheel brake cylinder pressure is rapidly increased in braking operation on a snow or frozen road and is slowly increased in braking operation on a normal road. It is, therefore, required to control the solenoid valves Va, Vb in a complicated manner for preventing the wheel road from locking in braking operation.

Furthermore, in the case that the road wheel tends to be locked by a low pressure in the wheel brake cylinder W/C, a small amount of the fluid under pressure is supplied to the wheel brake cylinder W/C from the accumulator ACC under control of the solenoid valves Va, Vb. In such a condition, the amount of fluid under pressure discharged from the pump P exceeds the amount of the fluid under pressure supplied to the wheel brake cylinder. This causes an excessive increase of the pressure in the accumulator ACC, resulting in an increase of the load acting on the pump P. Additionally, in the anti-skid apparatus, the piston 9 of reservoir Ra is displaced by the braking pressure applied thereto through the push rod 5 in braking operation. For this reason, if the solenoid valves Va, Vb are energized in a condition where the braking pressure is high, the reservoir piston 9 will be rapidly moved by the fluid under pressure supplied thereto from the wheel brake cylinder W/C. If the solenoid valves Va, Vb are energinzed in a condition where the braking pressure is low, the reservoir piston 9 will be slowly moved by the fluid under pressure supplied thereto from the wheel brake cylinder W/C. This causes undesired influence in operation of the anti-skid apparatus for pressure reduction in the wheel brake cylinder.

SUMMARY OF THE INVENTION

It is, therefore, a primary object of the present invention to provide an improved anti-skid apparatus capable of controlling the hydraulic power pressure in dependence upon the braking pressure created in the master cylinder in braking operation and eliminating an excessive load acting on the fluid pump even if the braking pressure is excessively increased.

Another object of the present invention is to provide an improved anti-skid apparatus capable of decreasing the pressure in the wheel brake cylinder without causing any undesired influence in the fluid reservoir.

According to the present invention, the objects are accomplished by providing an anti-skid apparatus for installation in a vehicle braking system including a bypass circuit connected in parallel with a braking circuit between a master cylinder and a wheel brake cylinder, which anti-skid apparatus comprises a fluid reservoir connected to the bypass circuit to store an amount of hydraulic fluid, a hydraulic power pressure source disposed within the bypass circuit and connected to the fluid reservoir to produce a hydraulic power pressure higher than a braking pressure applied to the wheel brake cylinder from the master cylinder, first switchover valve means disposed within the braking circuit and the bypass circuit to be activated when a road wheel tends to be locked in braking operation and being arranged to permit the flow of fluid under pressure supplied to the wheel brake cylinder through the braking circuit in its deactivated condition and to interrupt the braking circuit and connect the wheel brake cylinder to the fluid reservoir through the bypass circuit in its activated condition, and second switchover valve means disposed within the braking circuit between the master cylinder and the first switchover valve means and connected to the power pressure source through the bypass circuit to permit the flow of fluid under pressure supplied to the wheel brake cylinder through braking circuit while the first switchover valve means is maintained in its deactivated condition and to interrupt the braking circuit and permit the flow of fluid under pressure supplied to the wheel brake cylinder from the power pressure source in response to a decrease of the pressure in the wheel brake cylinder caused by activation of the first switchover valve means.

The anti-skid apparatus further comprises a regulator valve disposed within the bypass circuit between the power pressure source and the second switchover valve means to control the hydraulic power pressure in dependence upon the braking pressure created in the master cylinder in braking operation, and a relief valve disposed within the bypass circuit between the power pressure source and the second switchover valve means and associated with the fluid reservoir to discharge the fluid under pressure from the power pressure source into the fluid reservoir when the hydraulic power pressure exceeds a predetermined value.

In a practical embodiment of the present invention, it is preferable that the regulator valve, the relief valve and the fluid reservoir are arranged coaxially with each other and arranged in parallel with the second switchover valve means. It is also preferable that the second switchover valve means includes a pair of valve seats opposed to each other to form a fluid chamber in open communication with the braking circuit and the bypass circuit, a valve element disposed within the fluid chamber to be selectively engaged with the valve seats, a control piston arranged coaxially with the valve seats and having one end to be applied with the braking pressure and another end to be applied with the wheel brake cylinder pressure, the one end of the control piston being provided with a rod portion in engagement with the valve element, and resilient means for biasing the control piston toward the valve element.

BRIEF DESCRIPTION OF THE DRAWINGS

Additional objects, features and advantages of the present invention will be readily appreciated from the following detailed description of a preferred embodiment thereof when considered in connection with the accompanying drawings, in which.

DESCRIPTION OF THE PREFERRED EMBODIMENT

Figure 1:
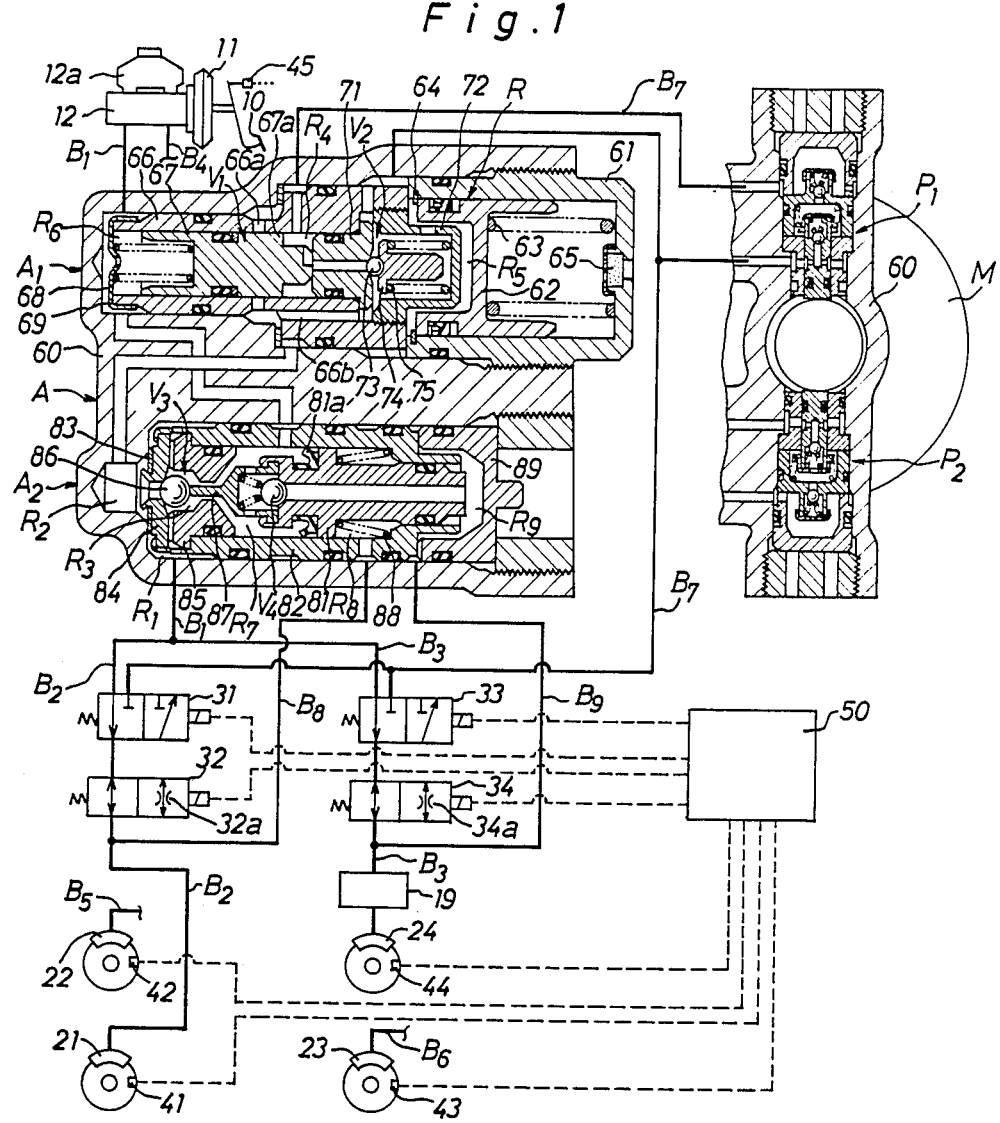
FIG. 1 is a schematic illustration of an anti-skid apparatus for installation in a vehicle braking system.

In FIG. 1 of the drawings there is schematically illustrated a braking system for automotive vehicles which includes a tandem master cylinder 12 equipped with a brake booster 11 to be activated by depression of a brake pedal 10. The tandem master cylinder 12 has a front pressure chamber connected to a left-hand front wheel brake cylinder 21 by way of conduits $B_1$ and $B_2$ and to a right-hand rear wheel brake cylinder 24 by way of conduits $B_1$ and $B_2$ and has a rear pressure chamber connected to a right-hand front wheel brake cylinder 22 by way of conduits $B_4$ and $B_5$ and to a left-hand rear wheel brake cylinder 23 by way of conduits $B_4$ and $B_6$.

An anti-skid apparatus for the braking system is arranged to independently control each hydraulic pressure applied to the wheel brake cylinders 21, 22, 23 and 24 when the road wheels tend to be locked in braking operation of the vehicle. The anti-skid apparatus includes an actuator assembly A disposed within the conduits $B_1$, $B_4$ to control each hydraulic pressure applied to the conduits $B_2$ and $B_3$ from the conduit $B_1$ and to control each hydraulic pressure applied to the conduits $B_5$ and $B_6$ from the conduit $B_4$. The anti-skid apparatus further includes electrically operated switchover valves 31 and 33 each disposed within the conduits $B_2$ and $B_3$, electrically operated flow control valves 32 and 34 each disposed within the conduits $B_2$ and $B_3$ between the switchover valves 31, 33 and the wheel brake cylinders 21, 24, wheel lock sensors 41, 42, 3 and 44 arranged to produce electric signals indicative of each rotational speed of the front and rear road wheels, and a normally open brake switch 45 arranged to be closed by depression of the brake pedal 10.

The anti-skid apparatus further includes electrically operated switchover valves (not shown) each disposed within the conduits $B_5$ and $B_6$, and electrically operated flow control valves (not shown) each disposed within the conduits $B_5$ and $B_6$ between the switchover valves (not shown) and the wheel brake cylinders 22, 23. In addition, a well-known proportioning valve 19 is disposed within the conduit $B_3$ between the flow control valve 34 and the wheel brake cylinder 24, and also a well-known proportioning valve (not shown) is disposed within the conduit $B_6$ between the flow control valve (not shown) and the wheel brake cylinder 23. For control of the switchover valves and flow control valves, a microcomputer 50 is connected to the brake switch 45 to be activated in response to depression of the brake pedal 10 and is connected to the wheel lock sensors 41-44 to detect each lock condition of the road wheels in dependence upon each value of the electric signals from sensors 41-44 thereby to produce a control signal therefrom when the road wheels tend to be locked in braking operation of the vehicle.

Hereinafter, the construction and operation of the anti-skid apparatus for control of the left-hand front road wheel and the right-hand rear road wheel will be described in detail. The switchover valves 31 and 33 are arranged to be intermittently energized in response to the control signal from computer 50. When maintained in deenergized condition, the switchover valves 31, 33 are positioned to connect therethrough the wheel brake cylinders 21, 24 to a fluid chamber $R_1$ in the actuator assembly A. When energized, the switchover valves 31, 33 are operated to connect therethrough the wheel brake cylinders 21, 24 to a bypass conduit $B_7$ which is connected in parallel with the conduit $B_1$ through a plunger pump $P_1$ and connected to a fluid reservoir R. Similarly to the switchover valves 31, 33, the flow control valves 32 and 34 are arranged to be energized in response to the control signals from computer 50. When maintained in deenergized condition, the flow control valves 32, 34 are positioned to permit therethrough free flow of fluid under pressure between the wheel brake cylinders 21, 24 and the switchover valves 31, 33 without causing any throttling effect to the fluid flow. When energized, the flow control valves 32, 34 are operated to connect the wheel brake cylinders 21, 24 to the switchover valves 31, 33 through throttles 32a, 34a provided therein.

The actuator assembly A includes a single housing 60 which is formed to contain therein the fluid pump $P_1$, a first valve mechanism part $A_1$ for controlling a hydraulic power pressure applied to a fluid chamber $R_2$ from the pump $P_1$ through the bypass conduit $B_7$, and a second valve mechanism part $A_2$ for controlling the flow of fluid under pressure applied thereto from the master cylinder 12 through the conduit $B_1$. The pump $P_1$ has an inlet port connected to the fluid reservoir R and switchover valves 31, 33 through the bypass conduit $B_7$ and an outlet port connected to a fluid chamber $R_4$ in the actuator assembly A through the bypass conduit $B_7$. The fluid chamber $R_4$ is connected to the fluid chamber $R_2$ through the first valve mechanism part $A_1$.

The fluid reservoir R is formed by a cylinder 61 threaded into the housing 60 in a fluid-tight manner and is provided therein with a piston 62 axially slidably disposed within the cylinder 61 to form a fluid chamber $R_5$, a coil spring 63 arranged to bias the piston 62 leftward in the figure, and a snap ring 64 fixed to the cylinder 61 to restrict leftward movement of the piston 62. Formed at the right side of piston 62 is an air chamber which is communicated with the atmospheric air through an air filter 65. When the fluid chamber $R_5$ is supplied with fluid under pressure, the piston 62 is moved rightward against the spring 63 to increase the capacity of chamber $R_5$. The pump $P_1$ is assembled within the housing 60 coaxially with another fluid pump $P_2$ for control of the other wheel brake cylinders 22, 23 and is driven by an electric motor M which is energized in response to the control signal from computer 50 when the road wheels tend to be locked in braking operation. In operation, the pumps $P_1$ and $P_2$ are supplied with hydraulic fluid from the chamber $R_5$ in reservoir R to discharge fluid under power pressure therefrom and supply it into the fluid chamber $R_4$ through the bypass conduit $B_7$.

The first valve mechanism part A1 includes a regulator valve assembly $V_1$ disposed within a communication passage between the fluid chambers $R_4$ and $R_2$, and a relief valve assembly $V_2$ associated with the fluid reservoir R. The regulator valve assembly $V_1$ comprises a cylinder 66 disposed in a fluid-tight manner within the housing 60 coaxially with the reservoir cylinder 61, a spool 67 axially slidably disposed within the cylinder 66, a coil spring 68 arranged to bias the spool 67 rightward in the figure, and a perforated cup-shaped retainer 69 fixedly coupled over the left end of cylinder 66 to receive the spring 68 thereon and to form a fluid chamber $R_6$ in open communication with the front pressure chamber of master cylinder 12 through conduit $B_1$. In operation, the spool 67 is moved leftward against the spring 68 by the hydraulic power pressure applied thereto in the fluid chamber $R_4$ so that a control edge 67a of spool 67 cooperates with radial holes 66a in cylinder 66 to throttle the flow of fluid under power pressure passing therethough from the chamber $R_4$ to a relief passage 66b so as to balance the pressure in chamber $R_4$ with a sum of the load of spring 68 and a master cylinder pressure applied to the left end of spool 67. In this instance, an excessive hydraulic fluid flows into the chamber $R_5$ in reservoir R through the relief valve assembly $V_2$.

The relief valve assembly $V_2$ comprises a valve seat 71 formed with an axial passage and coupled within the cylinder 66 in a fluid-tight manner, a cup-shaped holder 72 formed with a radial hole and threaded into the cylinder 66 to retain the valve seat 71 in place, a retainer 74 provided with a ball 73 secured thereto and disposed within the holder 72, and a compression coil spring 75 received by the holder 72 to bias the retainer 74 leftward in the figure. When the pressure in chamber $R_4$ is below a predetermined value, the ball 73 is maintained in engagement with the valve seat 71 to close the passage of valve seat 71. When the pressure in chamber $R_4$ exceeds the predetermined value, the ball 73 is disengaged from the valve seat 71 to permit the flow of fluid under pressure from the chamber $R_4$ to the reservoir R through the passage of valve seat 71. This is effective to maintain the pressure in chamber $R_4$ substantially at the predetermined value.

The second valve mechanism part $A_2$ includes a switchover valve assembly $V_3$ for interrupting the flow of fluid under regulated pressure from the chamber $R_2$ into the chamber $R_1$ in a normal braking operation, and a control piston 81 for control of the switchover valve $V_3$. The switchover valve $V_3$ comprises a cylinder 82 disposed in a fluid-tight manner within the housing 60 and arranged in parallel with the cylinder 66 of the first valve mechanism part $A_1$, the cylinder 82 being retained in place by a closure plug 89, a pair of valve seats 84 and 85 opposed to each other and coupled within the cylinder 82 to form a fluid chamber $R_3$ and radial passages for communication between the chambers $R_3$ and $R_1$, and a valve body 86 in the form of a ball disposed within the chamber $R_3$ to be engaged with the valve seat 84 or 85. The left-hand valve seat 84 is engaged with an inner end wall of housing 60 through an annular gasket 83 to define the chambers $R_1$ and $R_2$ in housing 60. When the ball 86 is maintained in engagement with the left-hand valve seat 84 under control of the control piston 81, the chamber $R_3$ is isolated from the chamber $R_2$ and communicated with a fluid chamber $R_7$ in cylinder 82 to permit the flow of fluid under pressure from the master cylinder 12 to the chamber $R_1$ therethrough. When the ball 86 is maintained in engagement with the right-hand valve seat 85, the chamber $R_3$ is isolated from the chamber $R_7$ and communicated with the chamber $R_2$ to permit therethrough the flow of fluid under regulated pressure from the chamber $R_2$ to the chamber $R_1$ under control of the regulator valve $V_1$.

The control piston 81 is axially slidably disposed within the cylinder 82 in a fluid-tight manner and is loaded leftward by means of a compression coil spring 88. The control piston 81 is integrally provided at its left end with a push rod member 87 which is in engagement with the ball 86 under the load of spring 88. An annular fluid chamber $R_8$ is formed between the control piston 81 and cylinder 82 and is connected to the conduit $B_2$ by way of a conduit $B_8$. A fluid chamber $R_9$ is formed between the control piston 81 and closure plug 89 and is connected to the conduit $B_3$ by way of a conduit $B_9$. An annular seal cup 81a is coupled over the control piston 81 to interrupt the flow of fluid under pressure from the chamber $R_7$ to the chamber $R_8$ and to permit the flow of fluid under pressure from the chamber $R_8$ to the chamber $R_7$. Assuming that the ball 86 is maintained in engagement with the right-hand valve seat when the pressure in chamber $R_7$ is decreased in response to release of the brake pedal 10, the seal cup 81a acts to permit the flow of fluid under pressure from the wheel brake cylinder 21 to the chamber $R_7$ through the conduits $B_2$, $B_8$ and chamber $R_8$. The control piston 81 is further provided therein with a check valve $V_4$ which is arranged to permit the flow of fluid under pressure from the wheel brake cylinder 24 to the chamber $R_7$ through the conduits $B_3$, $B_9$ and chamber $R_9$ in response to release of the brake pedal 10.

The actuator assembly A further includes first and second valve mechanism parts (not shown) disposed within the conduit $B_4$ for control of the right-hand front road wheel and the left-hand rear road wheel, the construction and operation of which are substantially the same as those in the first and second valve mechanism parts $A_1$ and $A_2$ described above.

Assuming that the anti-skid apparaus is inoperative during travel of the vehicle, the ball 86 of switchover valve $V_3$ is maintained in engagement with the left-hand valve seat 84 under control of the control piston 81 to permit the flow of fluid under pressure between the chambers $R_3$ and $R_7$ and to interrupt the flow of fluid under regulated pressure between the chambers $R_2$ and $R_3$, and the switchover valves 31, 33 and flow control valves 32, 34 are maintained in deenergized condition to permit the flow of fluid under pressure from the chamber $R_1$ to the wheel brake cylinders 21, 24 passing therethrough. In such a condition, the hydraulic braking pressure of master cylinder 12 caused by depression of the brake pedal 10 is applied to the chamber $R_1$ through the chambers $R_6$, $R_7$ and $R_3$ and is applied from the chamber $R_1$ to the wheel brake cylinders 21 and 24 through the conduits $B_2$ and $B_3$. Similarly, the hydraulic braking pressure of master cylinder 12 is applied to the wheel brake cylinders 22 and 23 through the conduits $B_4$, $B_5$, $B_6$ in the same manner as described above. This causes a normal braking operation of the vehicle. If the road wheels tend to be locked in the braking operation, the switchover valves 31, 33 and flow control valves 32, 34 are intermittently energized in response to the control signal from the computer 50, and simultaneously the motor M is energized in response to the control signal from the computer 50 to effect control of each hydraulic pressure in the wheel brake cylinders 21-24 as will be described hereinafter.

When energized, the switchover valves 31, 33 are operated to connect the conduits $B_2$ and $B_3$ to the bypass conduit $B_7$. As a result, the fluid under pressure in the wheel brake cylinders 21, 24 flows into the reservoir R and pump $P_1$ through the bypass conduit $B_7$ to decrease the braking pressure in the brake cylinders 21, 24. This is effective to prevent the road wheels from locking in the braking operation. In such a condition, the pressure in the chambers $R_8$ and $R_9$ is decreased below the master cylinder pressure in the chamber $R_7$ to cause rightward movement of the control piston 81 against the spring 88, while the chamber $R_2$ is applied with the hydraulic power pressure from the pump $P_1$ under control of the regulator valve $V_1$ at a higher level than the master cylinder pressure. As a result, the ball 86 of switchover valve $V_3$ is moved rightward and engaged with the right-hand valve seat 85 to establish fluid communication between the chambers $R_2$ and $R_3$ and to interrupt fluid communication between the chambers $R_3$ and $R_7$. Thus, the switchover valves 31, 33 are applied with the regulated power pressure from the chamber $R_1$ through the conduit $B_1$. Such operation as described above is instantaneously effected without causing any undesired influence in the fluid reservoir R.

When each rotation of the road wheels is allowed in response to an instantaneous decrease of the braking pressure in the wheel brake cylinders 21, 24, the switchover valves 31, 33 are deenergized in response to disappearance of the control signal from the computer 50. As a result, the switchover valves 31, 33 are positioned to disconnect the conduits $B_2$, $B_3$ from the bypass conduit $B_7$ and to connect them to the conduit $B_1$. Thus, the wheel brake cylinders 21, 24 are applied with the regulated power pressure from the chamber $R_2$ under control of the regulator valve $V_1$ through the chambers $R_3$, $R_1$, switchover valves 31, 33 and flow control valves 32, 34. This causes an increase of the braking pressure in the wheel brake cylinders 21, 24. In this instance, the hydraulic power pressure in chamber $R_3$ is maintained at a higher level than the master cylinder pressure in chamber $R_7$ under control of the regulator valve $V_1$, while the pressure in chambers $R_8$, $R_9$ is maintained at a lower level than the master cylinder pressure in chamber $R_7$ under control of the switchover valves 31, 33. For this reason, the ball 86 of switchover valve $V_3$ is maintained in engagement with the right-hand valve seat 85.

When the road wheels tend to be locked due to an intantaneous increase of the braking pressure in the wheel brake cylinders 21, 24, the switchover valves 31, 33 are energized in response to the control signal from the computer 50 to decrease the braking pressure in the same manner as described above. Subsequently, the intermittent energization of switchover valves 31, 33 will be effected under control of the computer 50 to prevent the road wheels from locking in the braking operation.

When the flow control valves 32, 34 are energized or deenergized under control of the computer 50 during the intermittent energization of the switchover valves 31, 33, the quantity of fluid under pressure flowing from the wheel brake cylinders 21, 24 to the reservoir R and pump $P_1$ or from the chamber $R_1$ to the wheel brake cylinders 21, 24 is controlled by the respective throttles 32a, 34a of valves 32, 34 to effect a slow or rapid decrease of the braking pressure and to effect a slow or rapid increase of the braking pressure. When the brake pedal 10 is released, the switchover valves 31, 33 and flow control valves 32, 34 are deenergized under control of the computer 50 to connect the conduits $B_2$, $B_3$ to the conduit $B_1$, and also the motor M is deenergized under control of the computer 50 to make the pump $P_1$ inoperative. In this instance, the seal cup 81a and check valve $V_4$ act to permit the flow of fluid under pressure passing therethrough from the wheel brake cylinders 21, 24 to a fluid reservoir 12a of the master cylinder 12, and in turn, the ball 86 of switchover valve $V_3$ is brought into engagement with the left-hand valve seat 84 under control of the control piston 81.

Figure 2:
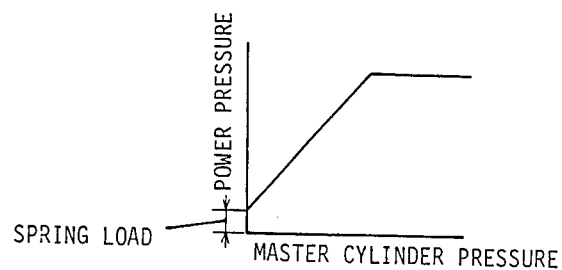
FIG. 2 is a graph indicating a relationship between a master cylinder pressure and a hydraulic power pressure.
Figure 3:
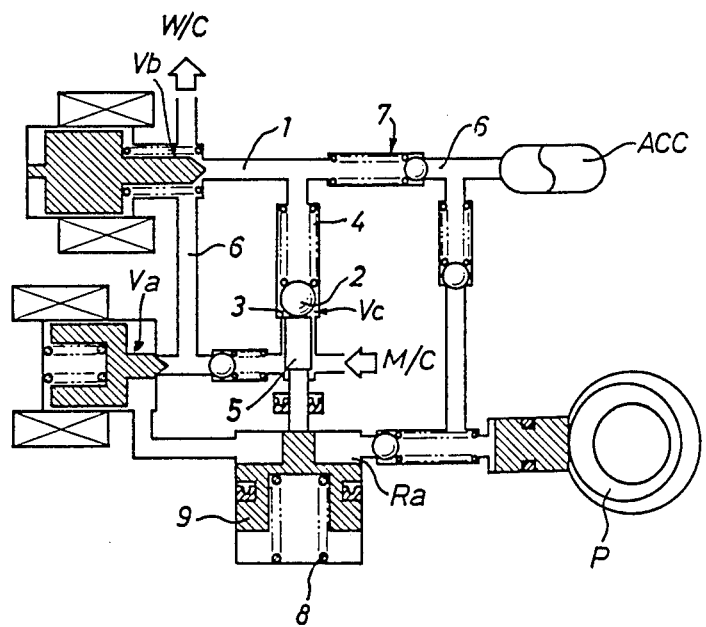
FIG. 3 is a schematic illustration of a conventional anti-skid apparatus.

From the above description, it will be understood that when the road wheels tend to be locked in the braking operation, the regulator valve $V_1$ acts to control the hydraulic power pressure applied thereto from the pump $P_1$ in dependence upon the master cylinder pressure applied to the chamber $R_6$ as shown in FIG. 2. As a result of such control of the hydraulic power pressure, an increase of the wheel brake cylinder pressure under control of the switchover valves 31, 33 is conducted in accordance with a level of the master cylinder pressure. This is useful to effect optimum control of the wheel brake cylinder pressure in a simple manner for preventing the wheel roads from locking in the braking operation. In the anti-skid apparatus, it is to be noted that the relief valve $V_2$ is associated with the fluid reservoir R to avoid an excessive increase of the hydraulic power pressure. This is useful to eliminate an excessive increase of the load acting on the pump $P_1$ even if the pressure in the master cylinder 12 is excessively increased or an excessive fluid may not be returned to the fluid reservoir R due to damage of the regulator valve $V_1$.

Furthermore, the actuator assembly A of the anti-skid apparatus is characterized in that the regulator valve $V_1$, relief valve $V_2$ and fluid reservoir R are arranged coaxially with each other and in parallel with the switchover valve $V_3$ and control piston 81 within the single housing 60. This is useful to provide the actuator assembly A in a relatively small size so as to faciliate the mounting of the same on a vehicle body structure. It is further noted that the ball 86 of cut-off valve $V_3$ is maintained in engagement with the control piston 81 under the load of spring 88. This is useful to minimize the component parts of the switchover valve $V_3$.

Although in the above embodiment, the switchover valves 31, 33 are arranged to alternately connect the conduits $B_2$, $B_3$ to the conduit $B_1$ or $B_7$, they may be replaced with a first electrically operated shut-off valve disposed within each of the conduits $B_2$, $B_3$ and a second electrically operated shut-off valve disposed within the bypass conduit $B_7$. In such a modification, the first shut-off valve is arranged to permit the flow of fluid under pressure from the conduit $B_1$ to the wheel brake cylinders 21, 24 in its deenergized condition, while the second shut-off valve is arranged to permit the flow of fluid under pressure from the wheel brake cylinders 21, 24 to the fluid reservoir R and pump $P_1$ in its energized condition.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An anti-skid apparatus for installation in a vehicle braking system including a braking circuit connecting a master cylinder to a wheel brake cylinder, comprising:
   a bypass circuit connected in parallel with an intermediate portion of said braking circuit;
   a fluid reservoir connected to said bypass circuit to store an amount of hydraulic fluid;
   a hydraulic power pressure source disposed within said bypass circuit and connected to said fluid reservoir to produce a hydraulic power pressure higher than a braking pressure applied to said wheel brake cylinder from said master cylinder;
   first switchover valve means disposed within said braking circuit and said bypass circuit to be activated when a road wheel tends to be locked in braking operation, said first switchover valve means being arranged to permit the flow of fluid under pressure supplied to said wheel brake cylinder through said braking circuit in its deactivated condition and to interrupt said braking circuit and connect said wheel brake cylinder to said fluid reservoir through said bypass circuit in its activated condition; and
   second switchover valve means disposed within said braking circuit between said master cylinder and said first switchover valve means and being connected to said power pressure source through said bypass circuit to permit the flow of fluid under pressure supplied to said wheel brake cylinder through said braking circuit while said first switchover valve means is maintained in its deactivated condition and to interrupt said braking circuit and permit the flow of fluid under pressure supplied to said wheel brake cylinder from said power pressure source in response to a decrease of the pressure in said wheel brake cylinder caused by activation of said first switchover valve means;
   wherein a regulator valve is disposed within said bypass circuit between said power pressure source and said second switchover valve means to control the hydraulic power pressure in dependence upon the braking pressure created in said master cylinder in braking operation, and a relief valve is disposed within said bypass circuit between said power pressure source and said second switchover valve means and associated with said fluid reservoir to discharge the fluid under pressure from said power pressure source into said fluid reservoir when the hydraulic power pressure exceeds a predetermined value.

2. An anti-skid apparatus as recited in claim 1, wherein said regulator valve and said relief valve are arranged coaxially with said fluid reservoir.

3. An anti-skid apparatus as recited in claim 1, wherein said second switchover valve means includes a pair of valve seats opposed to each other to form a fluid chamber in open communication with said braking circuit and said bypass circuit, a valve element disposed within said fluid chamber to be selectively engaged with said valve seats, a control piston arranged coaxially with said valve seats and having one end to be applied with the braking pressure and another end to be applied with the wheel brake cylinder pressure, the one end of said control piston being provided with a rod portion in engagement with said valve element, and resilient means for biasing said control piston toward said valve element.

4. An anti-skid apparatus as recited in claim 1, wherein said regulator valve, said relief valve and said fluid reservoir are arranged coaxially with each other and arranged in parallel with said second switchover valve means.

5. An anti-skid apparatus as recited in claim 1, wherein said hydraulic power pressure source is a fluid pump arranged to be driven by an electric motor when the road wheel tends to be locked in braking operation.

6. An anti-skid apparatus for installation in a vehicle braking system including a braking circuit connecting a master cylinder to a wheel brake cylinder, comprising:
   a bypass circuit connected in parallel with an intermediate portion of said braking circuit;
   a fluid reservoir connected to said bypass circuit to store an amount of hydraulic fluid;
   a hydraulic power pressure source disposed within said bypass circuit and connected to said fluid reservoir to produce a hydraulic power pressure higher than a braking pressure applied to said wheel brake cylinder from said master cylinder;

first switchover valve means disposed within said braking circuit and said bypass circuit to be activated when a road wheel tends to be locked in braking operation, said first switchover valve means being arranged to permit the flow of fluid under pressure supplied to said wheel brake cylinder through said braking circuit in its deactivated condition and to interrupt said braking circuit and connect said wheel brake cylinder to said fluid reservoir through said bypass circuit in its activated condition; and second switchover valve means disposed within said braking circuit between said master cylinder and said first switchover valve means and being connected to said power pressure source through said bypass circuit to permit the flow of fluid under pressure supplied to said wheel brake cylinder through said braking circuit while said first switchover valve means is maintained in its deactivated condition and to interrupt said braking circuit and permit the flow of fluid under pressure supplied to said wheel brake cylinder from said power pressure source in response to a decrease of the pressure in said wheel brake cylinder caused by activation of said first switchover valve means;

wherein said second switchover valve means includes a pair of valve seats opposed to each other to form a fluid chamber in open communication with said braking circuit and said bypass circuit, a valve element disposed within said fluid chamber to be selectively engaged with said valve seats, a control piston arranged coaxially with said valve seats and having one end to be applied with the braking pressure and another end to be applied with the wheel brake cylinder pressure, the one end of said control piston being provided with a rod portion in engagement with said valve element, and resilient means for biasing said control piston toward said valve element.

* * * * *